(12) United States Patent
Wang et al.

(10) Patent No.: US 10,153,468 B2
(45) Date of Patent: *Dec. 11, 2018

(54) LAMINATED POROUS FILM, NON-AQUEOUS ELECTROLYTE SECONDARY BATTERY SEPARATOR, AND NON-AQUEOUS ELECTROLYTE SECONDARY BATTERY

(71) Applicant: SUMITOMO CHEMICAL COMPANY, LIMITED, Tokyo (JP)

(72) Inventors: Jian Wang, Niihama (JP); Hirohiko Hasegawa, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/787,417

(22) PCT Filed: Apr. 20, 2015

(86) PCT No.: PCT/JP2015/062625
§ 371 (c)(1),
(2) Date: Oct. 27, 2015

(87) PCT Pub. No.: WO2016/170692
PCT Pub. Date: Oct. 27, 2016

(65) Prior Publication Data
US 2018/0040866 A1     Feb. 8, 2018

(51) Int. Cl.
*H01M 2/16* (2006.01)

(52) U.S. Cl.
CPC .......... *H01M 2/16* (2013.01); *H01M 2/1686* (2013.01)

(58) Field of Classification Search
CPC combination set(s) only.
See application file for complete search history.

(56) References Cited

U.S. PATENT DOCUMENTS

| 6,024,773 A | 2/2000 | Inuzuka et al. |
| 2014/0147726 A1 | 5/2014 | Toyoda |

(Continued)

FOREIGN PATENT DOCUMENTS

| JP | 10-189054 A | 7/1998 |
| JP | 2011-198532 A | 10/2011 |

(Continued)

OTHER PUBLICATIONS

International Search Report dated Aug. 4, 2015, issued by the International Searching Authority in application No. PCT/JP2015/062625.

*Primary Examiner* — Carlos Barcena
(74) *Attorney, Agent, or Firm* — Sughrue Mion, PLLC

(57) ABSTRACT

As a laminated porous film realizing excellent handling properties in a low-humidity environment, a laminated porous film in which a layer containing a polymer is laminated on at least one side of a polyolefin porous film, satisfying the following (1) and (2) is provided. (1) When the laminated porous film cut into a rectangle having a length on a side parallel with a machine direction of 60 mm, and a length on a side parallel with the direction perpendicular to the machine direction of 40 mm is left still for 1 hour in an environment at a temperature of 23° C. and a humidity of 50%, a lifting amount of the side parallel with the direction perpendicular to the machine direction is 8 mm or more. (2) When the laminated porous film cut into a rectangle having a length on a side parallel with a machine direction of 60 mm, and a length on a side parallel with the direction perpendicular to the machine direction of 40 mm is left still for 1 hour in an environment at a temperature of 23° C. and a humidity of 5%, a lifting amount of the side parallel with the machine direction is 12 mm or less.

9 Claims, 1 Drawing Sheet

(56) References Cited

U.S. PATENT DOCUMENTS

2014/0220402 A1  8/2014  Ueki et al.
2014/0377630 A1  12/2014  Kawakami et al.

FOREIGN PATENT DOCUMENTS

| JP | 2015-26609 A | 2/2015 |
| JP | 2015-111598 A | 6/2015 |
| WO | 2013/005796 A1 | 1/2013 |
| WO | 2013/031012 A1 | 3/2013 |
| WO | 2013/146126 A1 | 10/2013 |

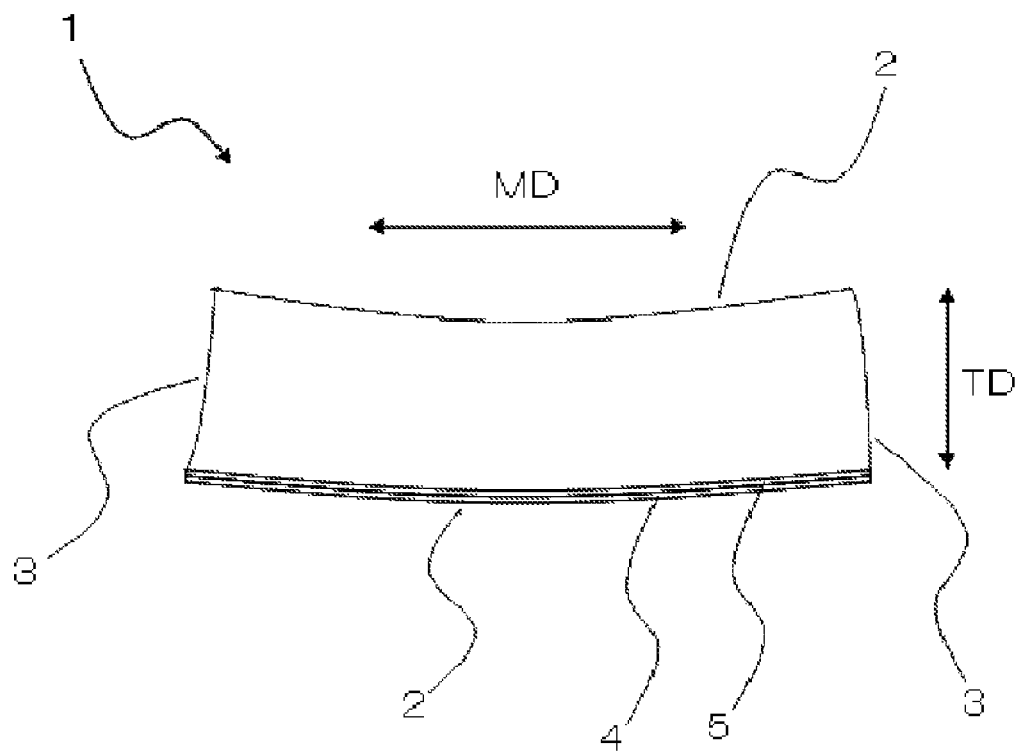

LAMINATED POROUS FILM, NON-AQUEOUS ELECTROLYTE SECONDARY BATTERY SEPARATOR, AND NON-AQUEOUS ELECTROLYTE SECONDARY BATTERY

CROSS REFERENCE TO RELATED APPLICATIONS

This application is a National Stage of International Application No. PCT/JP2015/062625 filed Apr. 20, 2015, the contents of all of which are incorporated herein by reference in their entirety.

TECHNICAL FIELD

The present invention relates to a laminated porous film that is suited as a non-aqueous electrolyte secondary battery separator, a non-aqueous electrolyte secondary battery separator comprising the laminated porous film, and a non-aqueous electrolyte secondary battery comprising the non-aqueous electrolyte secondary battery separator.

BACKGROUND ART

Non-aqueous electrolyte secondary batteries, particularly lithium ion secondary batteries are widely used as batteries for use in personal computers, cellular phones, portable information terminals and so on because of their high energy density.

Non-aqueous electrolyte secondary batteries as represented by these lithium ion secondary batteries have high energy density, and when an internal short-circuit or an external short-circuit occurs due to damage of a battery or damage of the device employing the battery, a high current flows, and severe heat generation occurs. For this reason, it is demanded to prevent heat generation over a certain degree and to ensure high safety in a non-aqueous electrolyte secondary battery.

As means for ensuring such safety, a method of imparting a shutdown function that blocks passage of ions between the positive and the negative electrodes by a separator in case of abnormal heat generation to prevent further heat generation is generally employed. As a method for imparting a shutdown function to a separator, a method of using a porous film formed of a material that melts in case of abnormal heat generation as a separator can be recited. That is, in the battery using this separator, the porous film melts and loses pores in case of abnormal heat generation, blocks passage of ions, and thus can prevent further heat generation.

As a separator having such a shutdown function, for example, a porous film of polyolefin is used. The separator formed of a polyolefin porous film melts at about 80 to 180° C. to lose pores in case of abnormal heat generation of the battery, and thus it blocks passage of ions (shutdown) and inhibits further heat generation.

By laminating a layer containing a polymer other than polyolefin, functions such as shape retentive property under heating at a temperature higher than the melting point of polyolefin, and adhesiveness with electrodes can be imparted to the polyolefin porous film. As a laminated porous film formed by laminating a layer containing a polymer other than polyolefin on the polyolefin porous film, for example, a laminated porous film that is produced by laminating a layer containing cellulose ether and fine particles on a polyolefin porous film, to which shape retentive property under heating at a temperature higher than the melting point of polyolefin is imparted (Patent Document 1), and a laminated porous film that is produced by laminating a layer containing polyvinylidene fluoride on a polyolefin porous film, to which adhesiveness with electrodes is imparted, having excellent uniformity of the electrode-to-electrode distance (Patent Document 2) are proposed.

PRIOR ART DOCUMENTS

Patent Documents

Patent Document 1: JP-A-2011-198532
Patent Document 2: JP-A-10-189054

DISCLOSURE OF THE INVENTION

Problems to be Solved by the Invention

A non-aqueous electrolyte secondary battery is typically structured by plurally laminating a positive electrode and a negative electrode via a separator. In production of a non-aqueous electrolyte secondary battery, the step of laminating electrodes and a separator is sometimes conducted in a low-humidity environment. For this reason, a non-aqueous electrolyte secondary battery separator is sometimes requested to be easily laminated with electrodes, and have excellent handling properties in a low-humidity environment.

However, in the aforementioned Patent Documents 1 and 2, the peripheral environment at the time of laminating a laminated porous film and electrodes when the laminated porous film is used as a separator for a non-aqueous electrolyte secondary battery is not taken into account, and hence there is a room for improvement in handling properties in a low-humidity environment.

It is an object of the present invention to provide a laminated porous film having excellent handling properties in a low-humidity environment.

Means for Solving the Problems

The present inventors made diligent efforts to solve the aforementioned problems, and found that the following invention agrees with the aforementioned object and finally accomplished the present invention.

That is, the present invention relates to the following aspects of the invention.

[1] A laminated porous film in which a layer comprising a polymer is laminated on at least one side of a polyolefin porous film, the laminated porous film satisfying the following (1) and (2):

(1) when the laminated porous film cut into a rectangle having a length of 60 mm on a side parallel with the machine direction, and a length of 40 mm on a side parallel with the direction perpendicular to the machine direction has been left still for 1 hour in an environment at a temperature of 23° C. and a humidity of 50%, a lifting amount of the side parallel with the direction perpendicular to the machine direction is 8 mm or more.

(2) when the laminated porous film cut into a rectangle having a length of 60 mm on a side parallel with the machine direction, and a length of 40 mm on a side parallel with the direction perpendicular to the machine direction has been left still for 1 hour in an environment at a temperature of 23° C. and a humidity of 5%, the lifting amount of the side parallel with the machine direction is 12 mm or less.

[2] The laminated porous film according to [1], wherein the modulus of elasticity in the direction perpendicular to the machine direction of the polyolefin porous film is lower than the modulus of elasticity in the machine direction.

[3] The laminated porous film according to [1] or [2], wherein the polymer is a hygroscopic polymer.

[4] The laminated porous film according to any one of [1] to [3], wherein the layer comprising a polymer further comprises fine particles.

[5] The laminated porous film according to any one of [1] to [4], wherein the layer comprising a polymer is laminated on one side of the polyolefin porous film.

[6] The laminated porous film according to any one of [1] to [5], wherein the polymer is a water-soluble polymer.

[7] The laminated porous film according to any one of [1] to [6], wherein the difference between the moisture content when the laminated porous film has been left still for 1 hour in an environment at a temperature of 23° C. and a humidity of 50% and the moisture content when the laminated porous film has been left still for 1 hour in an environment at a temperature of 23° C. and a humidity of 5% is 45 mg/m$^2$ or more.

[8] A non-aqueous electrolyte secondary battery separator comprising the laminated porous film according to any one of [1] to [7].

[9] A non-aqueous electrolyte secondary battery comprising the non-aqueous electrolyte secondary battery separator according to [8].

Effect of the Invention

According to the present invention, a laminated porous film that has excellent handling properties in a low-humidity environment, and is suited as a separator for a non-aqueous electrolyte secondary battery is provided.

BRIEF DESCRIPTION OF THE DRAWINGS

FIG. 1 is a schematic illustration showing a laminated porous film according to one embodiment of the present invention.

MODE FOR CARRYING OUT THE INVENTION

Hereinafter, the present invention will be described in detail.

A laminated porous film of the present invention includes a polyolefin porous film, and a layer containing a polymer laminated on at least one side of the polyolefin porous film, and when a film cut into a rectangle having a length of 60 mm on a side parallel with the machine direction (hereinafter also referred to as MD side), and a length of 40 mm on a side parallel with the direction perpendicular to the machine direction (hereinafter, also referred to as TD side) has been left still for 1 hour in an environment at a temperature of 23° C. and a humidity of 50%, a lifting amount of the TD side is 8 mm or more, and when the film has been left still for 1 hour in an environment at a temperature of 23° C. and a humidity of 5%, a lifting amount of the MD side is 12 mm or less. In the present description, the machine direction (hereinafter also referred to as MD) is defined as the direction in which a film is caused to flow mechanically during a production process of the film, and the direction perpendicular to the machine direction (hereinafter also referred to as TD) is defined as the direction that is perpendicular to both the machine direction and the thickness direction of the film.

In the laminated porous film, the polyolefin porous film (hereinafter also referred to as layer A) contains polyolefin as a main ingredient, and has the property of melting at elevated temperature to lose pores. Therefore, when the laminated porous film of the present invention is used as a separator, it imparts a shutdown function to the laminated porous film by melting and losing pores in case of abnormal heat generation of the battery.

The layer containing a polymer (hereinafter also referred to as layer B) which is laminated on layer A, imparts the shape retentive property under heating at a temperature higher than the melting point of polyolefin or imparts adhesiveness with electrodes to the laminated porous film, when the laminated porous film of the present invention is used as a separator.

<Polyolefin Porous Film>

A polyolefin porous film constituting layer A will be described.

Layer A has interconnected fine pores inside, and allows permeation of gas and liquid from one side to the other face.

The percentage of the polyolefin ingredient, based on the solids contained in layer A typically exceeds 50% by volume, and is preferably 70% by volume or more, more preferably 90% by volume or more, further preferably 95% by volume or more.

The polyolefin ingredient of layer A further contains a high molecular weight component having a weight average molecular weight of $5 \times 10^5$ to $15 \times 10^6$ from the view point of increasing the strength of layer A, in turn, the entire laminated porous film including layer A.

Examples of polyolefin include homopolymers or copolymers obtained by polymerization of olefins such as ethylene, propylene, 1-butene, 4-methyl-1-pentene, and 1-hexene. Among these, a high molecular weight polyethylene having a weight average molecular weight of 1000000 or more based on ethylene is preferred.

Layer A may contain other ingredient besides polyolefin as needed as long as the function of layer A is not impaired.

The pore diameter of layer A is preferably 3 μm or less, more preferably 1 μm or less from the view point of having excellent ion permeability and preventing entry of particles into the positive electrode or the negative electrode when the laminated porous film is used as a separator.

The thickness of layer A is preferably 4 to 40 μm, more preferably 7 to 30 μm, and is appropriately determined in consideration of the thickness of layer B of the laminated porous film.

The porosity of layer A is preferably 20 to 80% by volume, more preferably 30 to 70% by volume. Within such a range, excellent ion permeability, and excellent characteristics when the laminated porous film is used a separator of a battery are exhibited.

The mass per unit area of layer A is typically 4 to 15 g/m$^2$, preferably 5 to 12 g/m$^2$ in the point that the strength, film thickness, handling properties and weight of the laminated porous film, as well as the weight energy density and volume energy density of the battery when the laminated porous film is used as a separator for a battery can be increased.

The method for producing the polyolefin porous film constituting layer A is not particularly limited, and for example, a method of forming a film by adding a plasticizer to a thermoplastic resin and then removing the plasticizer with an appropriate solvent as described in JP-A-7-29563, a method of using a film of a thermoplastic resin produced in a known method, and selectively stretching an amorphous part which is structurally weak in the film to form micropores as described in JP-A-7-304110, and a method of forming a film by adding fine particles to a thermoplastic resin and then removing the fine particles as described in JP-A-2002-69221 can be recited.

<Layer Containing Polymer (Layer B)>

Layer B is preferably a layer having a saturated water percentage in an environment at a temperature of 23° C. and a humidity of 50% of higher than that of layer A. The saturated water percentage of layer B in an environment at a temperature of 23° C. and a humidity of 50% is preferably 1% by weight or more, more preferably 5% by weight or more.

The polymer constituting layer B will be described. The polymer in the present invention is a polymer other than polyolefin contained in layer A, and typically has hygroscopic characteristics different from those of the polyolefin contained in layer A. Preferably, it is a polymer having a higher saturated water percentage in an environment at a temperature of 23° C. and a humidity of 50% than that of polyolefin contained in layer A, more preferably a polymer having a saturated water percentage in an environment at a temperature of 23° C. and a humidity of 50% of 1% by weight or more, further preferably a polymer having a saturated water percentage in an environment at a temperature of 23° C. and a humidity of 50% of 5% by weight or more. In the present description, a polymer having a saturated water percentage in an environment at a temperature of 23° C. and a humidity of 50% of 1% by weight or more is called a hygroscopic polymer. The polymer can be selected depending on how layer B is intended to function.

The polymer constituting layer B may be one polymer or may be a combination of plural polymers.

A saturated water percentage in an environment at a temperature of 23° C. and a humidity of 50% of a polymer means a percentage of water contained in the polymer, and is determined by leaving the polymer still for 24 hours in an environment at a temperature of 23° C. and a humidity of 50%, and measuring the weight of water vaporized from the polymer when the polymer is heated to 150° C.

By selecting the polymer contained in layer B, layer B functions, for example, as an adhesive layer or a heat-resisting layer, and functions such as adhesiveness with electrodes, and shape retentive property under heating at a temperature higher than the melting point of polyolefin are imparted to the laminated porous film. Hereinafter, while an adhesive layer and a heat-resisting layer are recited as concrete examples of layer B, layer B is not limited to these.

When layer B is an adhesive layer, layer B will be interposed between layer A and electrodes in the non-aqueous electrolyte secondary battery that is obtained by using a separator for a non-aqueous electrolyte secondary battery formed of the laminated porous film, and laminating the electrodes (positive electrode and negative electrode) and the separator, and layer A and the electrodes are joined by layer B more favorably.

As a polymer contained in layer B when layer B functions as an adhesive layer, polymers that are excellent in adhesiveness with any of the positive electrode and the negative electrode and the polyolefin porous film, and insoluble to the electrolyte solution of the battery, and are electrically stable within the use range of the battery are preferred as such a polymer. For example, polyvinylidene fluoride resins can be recited. Examples of polyvinylidene fluoride resins include a homopolymer of vinylidene fluoride (i.e., polyvinylidene fluoride), copolymers with other monomer capable of copolymerizing with vinylidene fluoride, and mixtures thereof. Also in this case, layer B may contain fine particles as will be described later.

When layer B is a heat-resisting layer, the non-aqueous electrolyte secondary battery separator comprising the laminated porous film is excellent in shape stability at high temperature, and excellent in shape retentive property under heating at a temperature higher than the melting point of polyolefin.

As the polymer contained in layer B when layer B functions as a heat-resisting layer, polymers that are excellent in heat resistance, insoluble to the electrolyte solution of the battery, and are electrochemically stable within the use range of the battery are preferred. Examples of such a polymer include fluorine-containing resins such as polytetrafluoroethylene; fluorine-containing rubbers such as ethylene-tetrafluoroethylene copolymer; rubbers such as styrene-butadiene copolymer and hydride thereof, methacrylate ester copolymer, acrylonitrile-acrylate ester copolymer, styrene-acrylate ester copolymer, polyvinyl acetate, and ethylene-vinyl acetate-vinyl versatate polymer; resins having a melting point or a glass transition temperature of 180° C. or higher such as polyphenylene ether, polysulfone, polyethersulfone, polyphenylene sulfide, aramid, polyetherimide, polyamideimide, polyetheramide, and polyester; and binder resins such as polyvinyl alcohol, polyethylene glycol, cellulose ether, sodium alginate, polyacrylic acid, polyacrylamide, and polymethacrylic acid. Among these, water-soluble polymers which are polymers soluble to water are preferred in the point of process and environmental loads. Among the water-soluble polymers, at least one selected from the group consisting of cellulose ether, polyvinyl alcohol and sodium alginate are preferred, and in particular, cellulose ether is preferably used. Among cellulose ethers, carboxymethyl cellulose (CMC), and hydroxyethyl cellulose (HEC) that are chemically stable are preferred, and particularly CMC is preferred.

As a preferred hygroscopic polymer, the aforementioned water-soluble polymers can be recited.

The percentage of the polymer contained in layer B having a higher saturated water percentage in an environment at a temperature of 23° C. and a humidity of 50% than the polyolefin contained in layer A exceeds 50% by volume, and is preferably 70% by volume or more, more preferably 90% by volume, further preferably 95% by volume or more, based on the total of 100% by volume of the polymer ingredient contained in layer B.

The percentage of the hygroscopic polymer contained in layer B exceeds 50% by volume, and is preferably 70% by volume or more, more preferably 90% by volume or more, further preferably 95% by volume or more, based on the total of 100% by volume of the polymer ingredient contained in layer B.

Layer B may comprise other ingredient besides the polymer as needed as long as the function of layer B is not impaired. Examples of such an ingredient include fine particles, a dispersing agent, a plasticizer, and a pH modifier.

By further comprising fine particles in addition to the polymer, layer B can function as a layer that is excellent in shape retentive property under heating, so that linked micropores can be formed inside layer B, and the communicability is increased.

As the fine particles, an inorganic or organic filler that is generally called a filler can be used. Concrete examples include fillers of organic substances such as copolymers of one or two or more of styrene, vinyl ketone, acrylonitrile, methyl methacrylate, ethyl methacrylate, glycidyl methacrylate, glycidyl acrylate, and methyl acrylate; fluorine resins such as polytetrafluoroethylene, tetrafluoroethylene-hexafluoropropylene copolymer, tetrafluoroethylene-ethylene copolymer, and polyvinylidene fluoride; melamine resin; urea resin; polyethylene; polypropylene; and fillers of organic substances such as polymethacrylate, and fillers of inorganic substances such as calcium carbonate, talc, clay, kaolin, silica, hydrotalcite, diatomite, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, and glass. Among these, inorganic fillers are preferred as the filler from the view point of heat resistance and chemical stability, and inorganic oxides are more preferred, and alumina is particularly preferred.

These fillers can be used singly or in combination of two or more kinds.

While alumina has many crystal forms including α-alumina, β-alumina, γ-alumina, and θ-alumina, any of these can be preferably used. Among these, α-alumina is most preferred because it has especially high thermal and chemical stability.

While fine particles include various forms including a sphere, an ellipse, a rectangle, a gourd and the like shapes, and amorphous fine particles not having a definite shape depending on the production method of the fine particles, and the dispersing condition in preparing a coating liquid containing ingredients of layer B, any of these can be used.

Depending on the function and the degree of swelling in the electrolyte solution of the non-aqueous electrolyte secondary battery, layer B is preferably a porous layer, and its porosity is preferably 30 to 90% by volume, more preferably 40 to 85% by volume. The pore diameter is preferably 3 μm or less, more preferably 1 μm or less in terms of a diameter of a sphere when the pore is approximated to the sphere. When the average size of the pore diameter is 3 μm or less, even if carbon powder which is the main ingredient of the positive electrode and the negative electrode and small pieces thereof drop off in production of the non-aqueous electrolyte secondary battery, a short-circuit is difficult to occur.

Depending on the function, the thickness of layer B is typically 0.1 μm or more and 15 μm or less, preferably in the range of 1 μm or more and 10 μm or less. When the thickness of layer B is 10 μm or less, a lifting amount of the side parallel with the direction perpendicular to the machine direction (hereinafter the lifting of the side parallel with the direction perpendicular to the machine direction is also called MD curling) of the obtained laminated porous film after leaving still in an environment at a temperature of 23° C. and a humidity of 5% is not too large, and excellent load characteristics are easy to appear when a non-aqueous electrolyte secondary battery is produced. When it is 0.1 μm or more, the function of layer B is easy to appear.

When layer B is formed on both faces of layer A, the total thickness of the thickness of layer B on each face preferably falls within the aforementioned predetermined range of the thickness of layer B.

The mass per unit area of layer B is typically 1 to 30 g/m$^2$, preferably 3 to 25 g/m$^2$.

As a method for forming layer B on at least either face of layer A, while a method of separately preparing layer A and layer B and bonding them together is conceivable, a method of preparing a coating liquid containing ingredients of layer B (hereinafter also referred to as liquid B) and wet-coating layer A with the coating liquid, followed by removal of the medium is preferred.

A medium of liquid B (solvent or dispersion medium) may be any medium capable of dissolving or dispersing the ingredients of layer B containing a polymer uniformly and stably. Concretely, water, alcohols such as methanol, ethanol and isopropanol, acetone, toluene, xylene, hexane, N-methylpyrrolidone, N,N-dimethylacetamide, and N,N-dimethylformamide can be used singly, or a plurality of these solvents can be mixed as long as they are compatible.

From the view point of process and environmental loads, preferably, water occupies 80% by mass or more of the medium, and water alone is more preferred.

The method for applying liquid B on layer A is not particularly limited as long as uniform wet coating is possible, and a conventionally known method can be employed. For example, a capillary coating method, a spin coating method, a slit dye coating method, a spray coating method, a roll coating method, a screen printing method, a flexo printing method, a bar coater method, a gravure coater method, and a dye coater method can be employed. The thickness of layer B to be formed can be controlled by adjusting the applying amount of liquid B, and the concentration of the polymer in liquid B, or by adjusting the ratio of fine particles to the polymer when liquid B contains fine particles. Usually, application of liquid B to layer A, and removal of the medium from liquid B applied to layer A are successively conducted while layer A is conveyed. This makes it possible to laminate layer A and layer B successively even when layer A is long. The conveyance direction in which layer A is conveyed is the direction in which layer A is mechanically flown, namely the machine direction (MD). In the present description, the step of applying liquid B to layer A is defined as an applying step.

The method of obtaining liquid B is not particularly limited as long as uniform liquid B can be obtained by the method. When liquid B contains other ingredient, particularly fine particles besides the polymer, a mechanical stirring method, an ultrasonic dispersing method, a high pressure dispersing method, or a media dispersing method is preferred, and a high-pressure dispersing method is more preferred in that more uniform dispersion is easily achieved. The order of mixing in this method is arbitrary unless a special problem such as generation of a precipitate arises, and the polymer and the other ingredients such as fine particles may be added to the medium at once and mixed, or they may be added to the medium in an arbitrary order and mixed, or each ingredient may be dissolved or dispersed in a medium and then mixed together.

When water is contained as a medium of liquid B, it is preferred that layer A is subjected to a hydrophilization treatment before liquid B is applied on layer A. By subjecting layer A to the hydrophilization treatment, the applying properties are further improved, and more uniform layer B can be obtained. This hydrophilization treatment is effective particularly when the concentration of water in the medium is high.

The hydrophilization treatment of layer A may be conducted in any method, and concrete examples of the method include a treatment with a chemical such as acid or alkali, a corona treatment, and a plasma treatment.

Here, the corona treatment is advantageous in that layer A can be hydrophilized in a relatively short time, and reforming of polyolefin by corona discharge is limited to the surface and the vicinity of layer A, so that high applying properties can be ensured without changing the internal properties of layer A.

Removal of the medium from liquid B applied on layer A is preferably conducted by drying. Examples of drying methods include natural drying, air-blow drying, heat drying, and vacuum drying. Among these, natural drying is preferred. Depending on the medium in use, the drying temperature is preferably 30 to 80° C., more preferably 50 to 80° C. When it is 30° C. or higher, sufficient drying speed is achieved, and when it is 80° C. or lower, a laminated porous film having good appearance is obtained. In the present description, the step of removing the medium by drying after the applying step is defined as a drying step.

<Film Tension Applying Step>

It is preferred to apply a film tension to the obtained film in a predetermined environment after separately preparing layer A and layer B and bonding them together, or after the drying step. The film tension is such that when it is applied to a polyolefin porous film on which liquid B is not applied in the same temperature environment as the predetermined temperature environment, the polyolefin porous film shows an elongation percentage of 0.3 to 2%, preferably 0.3 to 2.0%, more preferably 0.4 to 1.5%, further preferably 0.5 to 1.0%. The time for applying the film tension is preferably 10 seconds or more, more preferably 20 seconds or more, and preferably 10 minutes or less, more preferably 5 minute or less.

In the present description, the step of applying a film tension after the drying step is defined as a film tension applying step.

By adjusting the elongation percentage and the time in the film tension applying step, it is possible to control the MD curling amount after leaving still in an environment at a temperature of 23° C. and a humidity of 50% for 1 hour, and thus to control the amount of lifting of the side parallel with the machine direction (hereinafter the lifting of the side parallel with the machine direction is also called TD curling) after leaving still in an environment at a temperature of 23° C. and a humidity of 5% for 1 hour.

While the temperature of the predetermined temperature environment differs depending on the material of the polyolefin porous film, it is preferably such a temperature that allows easy control of the film tension, and to be more specific, it is preferably 30 to 100° C., more preferably 50 to 80° C. In particular, when layer A contains polyethylene, the aforementioned temperature is particularly preferred.

When the film tension applying step is provided after the drying step, it may be arranged directly after the drying step, or it may be arranged after the drying step with one or more other steps being interposed therebetween. For example, when layer A is a long film that is handled in a roll, the film tension applying step is preferably arranged before winding the film into a roll after the drying step. It is also possible that the obtained film is wound into a roll to obtain a film roll after the drying step, and the film is subjected to the film tension applying step while the film is rewound from the film roll.

The film tension that makes elongation percentage of the polyolefin porous film on which liquid B is not applied fall within the predetermined range in the predetermined temperature environment can be measured by a heating tensile test.

The film tension in the film tension applying step exceeds 0 N, preferably 0.02 N or more, more preferably 0.05 N or more per 1 mm of film width. By conducting the applying step, the drying step, and the film tension applying step while conveying long layer A with application of such a film tension, it is possible to apply layer B on layer A stably and continuously.

The method for producing the laminated porous film of the present invention preferably includes the applying step, the drying step and the film tension applying step as described above, and may further include at least one other step in addition to these steps.

The laminated porous film of the present invention will be described by referring to FIG. 1. FIG. 1 is a schematic illustration showing a laminated porous film according to one embodiment of the present invention. A laminated porous film 1 has a bilayer structure in which a layer containing a polymer (layer B) 6 is laminated on one side of a polyolefin porous film (layer A) 5, and can consist of a side parallel with a machine direction (MD side) and a side parallel with the direction perpendicular to the machine direction (TD side) 3. Also the polyolefin porous film can consist of MD side and TD side as in the case of the laminated porous film.

While the layer structure of the laminated porous film in FIG. 1 is a bilayer structure in which layer B is laminated on one side of layer A, the layer structure of the laminated porous film in the present invention is not limited to this, and it is only required that layer B is laminated at least one side of layer A. For example, a trilayer structure in which layer B is laminated on both faces of layer A is applicable. Preferably, layer B is laminated only one side of layer A.

In the laminated porous film of the present invention, when the film is cut into a rectangular shape having a length of 60 mm on MD side and a length of 40 mm on TD side, and left still in an environment at a temperature of 23° C. and a humidity of 50% for 1 hour, the MD curling amount is 8 mm or more, and when the film has been left still in an environment at a temperature of 23° C. and a humidity of 5% for 1 hour, the TD curling amount is 12 mm or less. Since the MD curling amount is 8 mm or more, and the TD curling amount is 12 mm or less in the laminated porous film of the present invention, when the film is used as a non-aqueous electrolyte secondary battery separator, the MD curling amount and the TD curling amount are reduced, for example in a low-humidity environment such as 23° C. of temperature and 5% of humidity where the separator is incorporated into the battery, and the laminated porous film can be easily laminated with electrodes, and have excellent handling properties. Also, if the work is suspended after cutting out the separator in assembling of the battery, the work can be resumed rapidly because the position of the end part of the separator little changes. In the laminated porous film of the present invention, normally, MD curling and TD curling will not occur at the same time. This is because, for example, in a laminated porous film having TD curling, the TD curling inhibits MD from curling. In other words, the laminated porous film having a small TD curling amount is excellent in handling properties because MD curling does not occur at the same time.

When the hygroscopic characteristics differ between layer A and layer B, one contracts largely compared with the other, and curling is induced in a low-humidity environment, e.g., at a temperature of 23° C. and a humidity of 5%. It is substantially impossible that layer A and layer B formed of different materials have the same hygroscopic characteristics. In particular, when the modulus of elasticity in the direction perpendicular to the machine direction (hereinafter also referred to as TD modulus of elasticity) of layer A is smaller than the modulus of elasticity of the machine direction (hereinafter also referred to as MD modulus of elasticity), TD curling tends to be induced. In light of this, by imparting a curl in the direction opposite to the direction in which the TD curling occurs so that the MD curling amount after leaving still for 1 hour in an environment at a temperature of 23° C. and a humidity of 50% is 8 mm or more, it is possible to obtain a separator having a TD curling amount of 12 mm or less even in a low-humidity environment at a temperature of 23° C. and a humidity of 5%. The MD curling amount can be controlled by the conditions of the film tension applying step.

The direction opposite to the direction in which the TD curling occurs means, for example, the direction of curling downwardly when the TD curling occurs in the direction of curling upwardly when the laminated porous film is placed on a horizontal plate.

More preferably, the MD curling amount after leaving still for 1 hour in an environment at a temperature of 23° C. and a humidity of 50% is such a degree that the film does not roll up because excellent handling in a normal atmosphere such as in an environment at a temperature of 23° C. and a humidity of 50% is achieved. The TD curling amount after leaving still for 1 hour in an environment at a temperature of 23° C. and a humidity of 5% is preferably 10 mm or less, more preferably 5 mm or less. The TD curling amount after leaving still for 1 hour in an environment at a temperature of 23° C. and a humidity of 5% is preferably 0.5 mm or more, more preferably 1 mm or more from the view point of inhibiting MD curling.

In the laminated porous film of the present invention, difference between the moisture content after leaving still for 1 hour in an environment at a temperature of 23° C. and a humidity of 50% and the moisture content after leaving still for 1 hour in an environment at a temperature of 23° C. and a humidity of 5% is preferably 45 mg/m$^2$ or more. Such a laminated porous film can be obtained by appropriately adjusting the kind of polymer, the contained percentage of polymer in layer B, and thickness of layer B.

According to the laminated porous film having such a difference in moisture content (water content), it becomes possible to control the MD curling amount and the TD curling amount by adjusting the conditions of the film tension applying step.

The MD curling amount is a value obtained by leaving still the laminated porous film cut into a rectangular shape of 60 mm long on MD side and 40 mm long on TD side, on a flat face for 1 hour in an environment at a temperature of 23° C. and a humidity of 50%, and measuring a distance from the flat face to the TD side in the part where lifting of TD side from the flat face is maximum.

TD curling amount is a value obtained by leaving still the laminated porous film cut into a rectangular shape of 60 mm long on MD side and 40 mm long on TD side, on a flat face for 1 hour in an environment at a temperature of 23° C. and a humidity of 5%, and measuring a distance from the flat face to the MD side in the part where lifting of MD side from the flat face is maximum.

Regarding the MD curling amount and the TD curling amount, measurement is conducted for both of the case where one side of the laminated porous film is the face contacting the flat face, and the case where the other face is the face contacting the flat face. Of the determined values, a larger value, or the value when the determined values are the same is determined as the MD curling amount and the TD curling amount of the laminated porous film.

The entire thickness of the laminated porous film (layer A+layer B) of the present invention is typically 5 to 50 μm, preferably 8 to 40 μm, particularly preferably 9 to 30 μm. When the thickness of the entire laminated porous film is 5 μm or more, an initial defect due to a short-circuit is difficult to occur when a non-aqueous electrolyte secondary battery is produced by using the laminated porous film as a separator, whereas when it is 50 μm or less, the capacity of the battery tends to increase.

The mass per unit area of the entire laminated porous film (layer A+layer B) of the present invention is typically 5 to 45 g/m$^2$, preferably 8 to 35 g/m$^2$.

The laminated porous film of the present invention may contain a porous membrane such as a heat resistant membrane, an adhesive membrane and a protective membrane other than layer A and layer B as long as the object of the present invention is not impaired.

The laminated porous film of the present invention can be suitably used as a separator of a battery, in particular a non-aqueous electrolyte secondary battery such as a lithium ion secondary battery.

By producing a non-aqueous electrolyte secondary battery using a non-aqueous electrolyte secondary battery separator of the present invention, the non-aqueous electrolyte secondary battery has high load characteristics, and the separator exerts an excellent shutdown function, and an excellent non-aqueous electrolyte secondary battery is achieved.

EXAMPLES

Hereinafter, the present invention will be described more specifically by way of Examples; however, it is to be noted that the present invention is not limited to these Examples.

In Examples and Comparative Examples, physical properties of the polymer contained in layer B, the polyolefin porous film and the laminated porous film were measured according to the following methods.

(1) Saturated Water Percentage of Polymer Contained in Layer B (Unit: % by Weight):

Using Thermoprep, Model 860 (available from Metrohm Ltd.), a polymer after leaving still for 24 hours in an environment at a temperature of 23° C. and a humidity of 50% was heated to 150° C., and then the moisture content vaporized from the polymer was measured by using a Model 831 KF coulometer (available from Metrohm Ltd.). Then the weight percentage of the moisture content, relative to 100% by weight of the weight of the polymer after leaving still for 24 hours in an environment at a temperature of 23° C. and a humidity of 50% and before heating was calculated, and the obtained weight percentage of the moisture content was determined as a saturated water percentage of the polymer in an environment at a temperature of 23° C. and a humidity of 50%.

(2) Difference in Moisture Content of Laminated Porous Film (Unit: g/m$^2$):

Each of the laminated porous film (laminated porous film A) after leaving still for 24 hours in an environment at a temperature of 23° C. and a humidity of 50%, and the laminated porous film (laminated porous film B) after leaving still for 24 hours in an environment at a temperature of 23° C. and a humidity of 5% was heated to 150° C. by using Thermoprep, Model 860 (available from Metrohm Ltd.), and then a moisture content vaporized from each of the laminated porous films was measured by using a Model 831 KF coulometer (available from Metrohm Ltd.), and a moisture content per 1 m$^2$ of each laminated porous film was determined. Further, from the obtained moisture content of the laminated porous film A and the moisture content of the laminated porous film B, difference (difference=moisture content of laminated porous film A−moisture content of laminated porous film B) was calculated, and the difference was determined as difference in moisture content of the laminated porous film.

(3) Polyolefin Porous Film Elongation Percentage (Unit: %):

Using a tensile tester (available from A&D Company, Limited, TENSILON universal testing machine RTG-1310), and following JISK7127, an elongation percentage (elongation percentage=100×(length of film after application of film tension−length of film before application of film tension)/length of film before application of film tension) when a predetermined film tension per 1 mm of film was applied to the polyolefin porous film at a straining rate of 250%/minute at each measurement temperature was determined.

(4) Thickness Measurement (Unit: μm):

Using a high-accuracy digital length measuring machine (available from Mitutoyo Corporation), thicknesses of the polyolefin porous film and the laminated porous film were measured.

(5) Mass Per Unit Area (Unit: g/m$^2$):

Each of the polyolefin porous film and the laminated porous film was cut into a square 10 cm on a side, and weight W (g) was measured. Then according to the formula: mass per unit area (g/m$^2$)=W/(0.1×0.1), a mass per unit area of each of the polyolefin porous film and the laminated porous film was calculated. A mass per unit area of layer B was calculated by subtracting the mass per unit area of the polyolefin porous film from the mass per unit are of the laminated porous film.

(6) MD Curling Amount (Unit: mm):

The laminated porous film was cut into a rectangle having a length on MD side of 60 mm and a length on TD side of 40 mm to obtain a sample, and the obtained sample was left still for 1 hour on the flat face in an environment at a temperature of 23° C. and a humidity of 50%, and then a distance from the flat face to the TD side in the part where lifting of TD side from the flat face is maximum was measured with a rule, and the obtained value was determined as a MD curling amount. Measurement of the MD curling amount was conducted for both of the case where one side of the sample is the face contacting the flat face, and the case where the other face is the face contacting the flat face, and of the determined MD curling amounts, a larger value, or the value when the determined values are the same was determined as the MD curling amount of the laminated porous film. Also when the MD side was curled cylindrically, the sample was determined as unmeasurable.

(7) TD Curling Amount (Unit: mm):

The laminated porous film was cut into a rectangle having a length of MD side of 60 mm and a length of TD side of 40 mm to obtain a sample, and the obtained sample was left still for 1 hour on the flat face in an environment at a temperature of 23° C. and a humidity of 5%, and then a distance from the flat face to the MD side in the part where lifting of MD side from the flat face is maximum was measured with a rule, and the obtained value was determined as a TD curling amount. Measurement of the TD curling amount was conducted for both of the case where one side of the sample is the face contacting the flat face, and the case where the other face is the face contacting the flat face, and of the determined TD curling amounts, a larger value, or the value when the determined values are the same was determined as the MD curling amount of the laminated porous film. Also when the TD side was curled cylindrically, the sample was determined as unmeasurable.

<Polyolefin Porous Film (Layer A)>

To a total of 100% by weight of 70% by weight of high molecular weight polyethylene powder (GUR4032, available from TICONA) and 30% by weight of polyethylene wax (FNP-0115, available from NIPPON SEIRO CO., LTD.) having a weight average molecular weight of 1000, 0.4% by weight of an antioxidant (Irg1010, available from Ciba Specialty Chemicals Holding Inc.), 0.1% by weight of an antioxidant (P168, available from Ciba Specialty Chemicals Holding Inc.), and 1.3% by weight of sodium stearate were added, and further calcium carbonate having an average grain size of 0.1 μm (available from MARUO CALCIUM CO., LTD.) was added to occupy 38% by volume of the entire volume, and these in the form of power were mixed with a Henschel mixer, and then melt-kneaded with a biaxial kneading machine to give a polyolefin resin composition. The polyolefin resin composition was rolled with a pair of rollers having a surface temperature of 150° C. to prepare a sheet. The sheet was then dipped in an aqueous solution of hydrochloric acid (hydrochloric acid 4 mol/L, nonionic surfactant 0.5% by weight) to remove calcium carbonate, and sequentially stretched to six times at 105° C. to obtain a polyolefin porous film (film thickness: 18 μm, mass per unit area: 7 g/m$^2$). TD modulus of elasticity of the obtained polyolefin porous membrane showed a lower value than MD modulus of elasticity. Elongation percentage of the obtained polyolefin porous film is shown in Table 1.

TABLE 1

| Temperature (° C.) | Film tension (N/mm) | Elongation percentage (%) |
|---|---|---|
| 65 | 0.07 | 0.4 |
| 65 | 0.10 | 0.6 |
| 65 | 0.13 | 0.8 |
| 80 | 0.15 | 2.4 |

Example 1

(1) Preparation of Liquid B

Liquid B of Example 1 was prepared in the following procedure.

To a medium containing water and isopropyl alcohol in a weight ratio of 95:5, carboxymethyl cellulose (CMC, Daicel FineChem Ltd.: 1110, moisture percentage 14% by weight) and alumina (available from Sumitomo Chemical Co., Ltd.: AKP3000) were added in a weight ratio of 6:100 and mixed so that the solid concentration was 28% by weight, and treated three times under a high-pressure dispersion condition to prepare liquid B.

(2) Production of Laminated Porous Film

Using a gravure coating machine, liquid B was directly applied on one side of the polyolefin porous film having subjected to a corona treatment, and dried. Then the film was passed through a heating furnace at 65° C. for 25 seconds while 0.07 N of film tension per 1 mm film width was applied to obtain a laminated porous film. The entire thickness of the obtained laminated porous film was 24 μm, the mass per unit area of layer B was 8.7 g/m$^2$, and the entire mass per unit area was 15.9 g/m$^2$. The treatment condition of the film tension applying step, and physical properties of the obtained laminated porous film are shown in Table 2.

Example 2

A laminated porous film was obtained by the same procedure except that the film tension was 0.10 N per 1 mm of the film width in Example 1. The entire thickness of the obtained laminated porous film was 24 μm, the mass per unit area of layer B was 9.1 g/m$^2$, and the mass per unit area was 16.3 g/m$^2$. The treatment condition of the film tension applying step, and physical properties of the obtained laminated porous film are shown in Table 2.

Example 3

A laminated porous film was obtained by the same procedure except that the film tension was 0.13 N per 1 mm of the film width in Example 1. The entire thickness of the obtained laminated porous film was 24 μm, the mass per unit area of layer B was 9.1 g/m², and the mass per unit area was 16.3 g/m². The treatment condition of the film tension applying step, and physical properties of the obtained laminated porous film are shown in Table 2.

Comparative Example 1

A laminated porous film was obtained by the same procedure except that the time of passage through the heating furnace was 5 seconds in Example 2. The entire thickness of the obtained laminated porous film was 24 μm, the mass per unit area of layer B was 8.1 g/m², and the mass per unit area was 15.3 g/m². The treatment condition of the film tension applying step, and physical properties of the obtained laminated porous film are shown in Table 2.

Comparative Example 2

The same operation was conducted except that the temperature of the heating furnace was 80° C. and the film tension was 0.15N per 1 mm of the film width in Example 1. An end part of the film bent in the vicinity of the outlet of the heating furnace, and a laminated porous film could not be obtained.

TABLE 2

|  | Film tension applying step | | | Laminated porous film | | |
| --- | --- | --- | --- | --- | --- | --- |
|  | Film tension (N/mm) | Temperature (° C.) | Time (s) | Difference in moisuture content (mg/m²) | MD curling amount (mm) | TD curling amount (mm) |
| Example 1 | 0.07 | 65 | 25 | 66 | 10 | 11 |
| Example 2 | 0.10 | 65 | 25 | 70 | Unmeasurable | 7 |
| Example 3 | 0.13 | 65 | 25 | 70 | Unmeasurable | 6 |
| Comparative Example 1 | 0.10 | 65 | 5 | 62 | 17 | Unmeasurable |

Each of the laminated porous films obtained in Examples 1 to 3, when used as a separator for a non-aqueous electrolyte secondary battery, was easy to be laminated with electrodes and superior in handling properties because it had a small TD curling amount and no MD curling in a low-humidity environment at a temperature of 23° C. and a humidity of 5%. The laminated porous film obtained in Comparative Example 1, when used as a separator for a non-aqueous electrolyte secondary battery, was difficult to be laminated with electrodes and inferior in handling properties because the TD curling amount was not reduced in a low-humidity environment at a temperature of 23° C. and a humidity of 5%.

DESCRIPTION OF REFERENCE SIGNS

1 Laminated porous film
2 Side parallel with machine direction (MD side)
3 Side parallel with direction perpendicular to machine direction (TD side)
4 Polyolefin porous film (layer A)
5 Layer containing polymer (layer B)

The invention claimed is:
1. A laminated porous film in which a layer comprising a polymer is laminated on at least one side of a polyolefin porous film, the laminated porous film satisfying the following (1) and (2):
 (1) when the laminated porous film cut into a rectangle having a length of 60 mm on a side parallel with the machine direction, and a length of 40 mm on a side parallel with the direction perpendicular to the machine direction has been left still for 1 hour in an environment at a temperature of 23° C. and a humidity of 50%, a lifting amount of the side parallel with the direction perpendicular to the machine direction is 8 mm or more,
 wherein the lifting amount is a distance from the flat face to the side parallel with the direction perpendicular to the machine direction in the part where lifting of the side from the flat face is maximum;
 (2) when the laminated porous film cut into a rectangle having a length of 60 mm on a side parallel with the machine direction, and a length of 40 mm on a side parallel with the direction perpendicular to the machine direction has been left still for 1 hour in an environment at a temperature of 23° C. and a humidity of 5%, the lifting amount of the side parallel with the machine direction is 12 mm or less,
 wherein the lifting amount is a distance from the flat face to the side parallel with the machine direction in the part where lifting of the side from the flat face is maximum.

2. The laminated porous film according to claim 1, wherein the modulus of elasticity of the polyolefin porous film in the direction perpendicular to the machine direction is lower than the modulus of elasticity in the machine direction.

3. The laminated porous film according to claim 1, wherein the polymer is a hygroscopic polymer.

4. The laminated porous film according to claim 1, wherein the layer comprising a polymer further comprising particles.

5. The laminated porous film according to claim 1, wherein the layer comprising a polymer is laminated on one side of the polyolefin porous film.

6. The laminated porous film according to claim 1, wherein the polymer is a water-soluble polymer.

7. The laminated porous film according to claim 1, wherein the difference between the moisture content when the laminated porous film has been left still for 1 hour in an environment at a temperature of 23° C. and a humidity of 50% and the moisture content when the laminated porous film has been left still for 1 hour in an environment at a temperature of 23° C. and a humidity of 5% is 45 mg/m$^2$ or more.

8. A non-aqueous electrolyte secondary battery separator comprising the laminated porous film according to claim 1.

9. A non-aqueous electrolyte secondary battery comprising the non-aqueous electrolyte secondary battery separator according to claim 8.

* * * * *